United States Patent
Foster

(10) Patent No.: US 6,643,386 B1
(45) Date of Patent: Nov. 4, 2003

(54) METHOD AND APPARATUS FOR ADDING WATERMARKS TO IMAGES AND/OR VIDEO DATA STREAMS

(75) Inventor: Ronald R. Foster, Los Gatos, CA (US)

(73) Assignee: OmniVision Technologies, Inc., Sunnyvale, CA (US)

( * ) Notice: Subject to any disclaimer, the term of this patent is extended or adjusted under 35 U.S.C. 154(b) by 573 days.

(21) Appl. No.: 09/638,800

(22) Filed: Aug. 10, 2000

(51) Int. Cl.[7] .................................................. G06K 9/00
(52) U.S. Cl. ........................................ 382/100; 396/310
(58) Field of Search ................................ 382/100, 232; 396/310, 315; 348/460, 463; 386/94; 283/113; 380/200, 201, 202, 203

(56) References Cited

U.S. PATENT DOCUMENTS

| | | | | |
|---|---|---|---|---|
| 3,971,065 A | * | 7/1976 | Bayer | 348/276 |
| 4,200,376 A | * | 4/1980 | Takeuchi et al. | 396/18 |
| 4,880,292 A | * | 11/1989 | Kageyama et al. | 359/457 |
| 4,994,831 A | * | 2/1991 | Marandi | 396/332 |
| 5,726,719 A | * | 3/1998 | Tanaka et al. | 349/8 |
| 5,771,071 A | * | 6/1998 | Bradley et al. | 348/335 |
| 5,797,837 A | * | 8/1998 | Minami | 600/109 |
| 5,819,123 A | * | 10/1998 | Watanabe | 396/200 |
| 5,901,257 A | * | 5/1999 | Chen et al. | 382/312 |
| 5,937,207 A | * | 8/1999 | Ito et al. | 396/6 |
| 6,097,361 A | * | 8/2000 | Rohner | 345/87 |
| 6,231,148 B1 | * | 5/2001 | Silverbrook | 347/2 |
| 6,249,588 B1 | * | 6/2001 | Amidror et al. | 382/100 |
| 6,535,629 B2 | * | 3/2003 | McCormick et al. | 382/154 |

* cited by examiner

*Primary Examiner*—Leo Boudreau
*Assistant Examiner*—Ryan J. Miller
(74) *Attorney, Agent, or Firm*—Perkins Coie LLP

(57) ABSTRACT

A watermark can be permanently and simultaneously added to image data, such as to a video data stream, produced by an image sensor. To produce the watermark in the image data, color filters of a filter array overlying pixels of a sensor array can be arranged in a watermark pattern different from the normal pattern of other color filters of the filter array. The color filters in the watermark pattern can have different colors than other color filters of the filter array. Alternatively or in addition to the watermark pattern of the color filters, a pattern can be formed in a microlens array overlying the filter array. The pattern in the microlens array can have regions devoid of microlenses, microlenses having different shapes, or microlenses having different colors.

20 Claims, 3 Drawing Sheets

METHOD AND APPARATUS FOR ADDING WATERMARKS TO IMAGES AND/OR VIDEO DATA STREAMS

BACKGROUND OF THE INVENTION

1. Field of the Invention

The present invention generally relates to image sensors, and more particularly, to complementary metal oxide semiconductor (CMOS) image sensors that use a method to permanently encode a watermark in a video data output stream.

2. Background Information

Watermarks, such as those found in video content, are used for a variety of purposes. They serve to identify copyrights to the video content and to identify in some manner the author of the original work, thereby lending credence and validity to the substance of the work. In video recordings and on broadcast television (TV), watermarks are typically located in the bottom right corner of the TV screen, and therefore serve to identify the broadcast network or serve a promotional purpose.

Video watermarks are added in a separate post-processing step to the raw video stream before the signal/stream is broadcast. Typically, an organization's logo or other distinguishing mark is reduced to an outline having an appropriate size for the video image, and the outline is then combined arithmetically in the luminance channel with the incoming video stream. The resulting video image now has a watermark that allows the majority of the original video image to be seen through the watermark, but in a manner that allows the watermark to be clearly discernable. Similarly, the chrominance channel can be altered to render a watermark in color.

However, this separate post-processing step is cumbersome and requires extra equipment. Furthermore, because the watermarks are added to the video data stream or images during this post-processing step, the watermarks suffer from a lack of permanence. That is, subsequent processing or counterfeiting to edit/delete the watermark can be difficult to detect, since both the legitimate process to apply the watermark and the subsequent illegitimate editing/deletion of the watermark are performed in a post-processing manner on the video data stream or images. Therefore, improvements are needed in adding watermarks to images and/or video data streams.

BRIEF DESCRIPTION OF THE DRAWINGS

Non-limiting and non-exhaustive embodiments of the present invention will be described in the following figures, wherein like reference numerals refer to like parts throughout the various views unless otherwise specified.

DETAILED DESCRIPTION OF THE ILLUSTRATED EMBODIMENTS

Embodiments of a method and apparatus for adding a watermark to a image or video data stream are described in detail herein. In the following description, some specific details are provided to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Also, the particular features, structures, or characteristics may be combined in any suitable manner in one or more embodiments.

For simplicity and clarity of explanation, various embodiments of the invention are shown in FIGS. 3–7 as cross-sectional views. It is to be appreciated that such views are merely illustrative and are not necessarily drawn to scale or to the exact shape. Furthermore, it is to be appreciated that the actual devices utilizing principles of the invention may vary in shape, size, configuration, etc., other than what is shown in FIGS. 3–7, due to different manufacturing processes, equipment, design tolerances, or other practical considerations.

An embodiment of the invention provides a method of incorporating an indelible or permanent watermark directly into an image and/or video output stream generated by an imaging device. This eliminates the need for a separate post-processing step and its associated equipment.

By employing this method, individual, unique, and serialized cameras or other imaging devices can be manufactured cost effectively. A possible use of such uniquely watermarked cameras is in law enforcement and other activities that require verification of the image/video as being generated by a particular camera. Hence, images/video having watermarks can be legitimately matched with the uniquely watermarked cameras that created them, which can be operated by a distinctive organization or agency, such as police departments, the Federal Bureau of Investigation (FBI), the Drug Enforcement Agency (DEA), etc.

Figure 1:
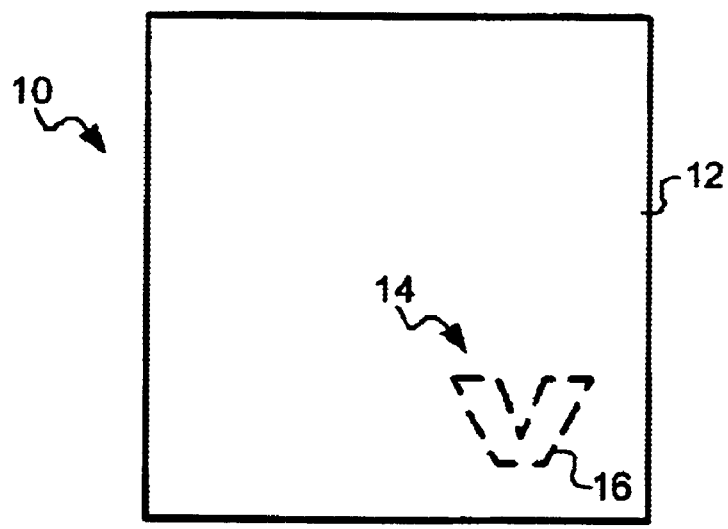
FIG. 1 shows an image having a first type of watermark that can be produced according to an embodiment of the invention.

Shown generally at 10 in FIG. 1 is an example of an image that can be produced according to an embodiment of the invention. The image 10 can be a single image (e.g., a photograph) or it can comprise one or more frames of video, for example. The image 10 includes a region 12 where conventional image data is displayed. The image 10 further includes a watermark 14 that can be located anywhere on the image 10, with the watermark 14 being located on the lower right corner of the image 10 in FIG. 1 for illustrative purposes.

The watermark 14, in one embodiment, can have an "outline" form, such that its border 16 is discernable from the image data shown in the region 12. The border 16 is discernable by being of a different color, darkness, brightness, etc. than the image data in the region 12. Areas within the border 16 of the watermark 14 can be "transparent" to allow image data of the region 12 to appear through the watermark 14, or the areas within the border 16 can be semi-transparent, colored, colored and semi-transparent, etc.

Figure 2:
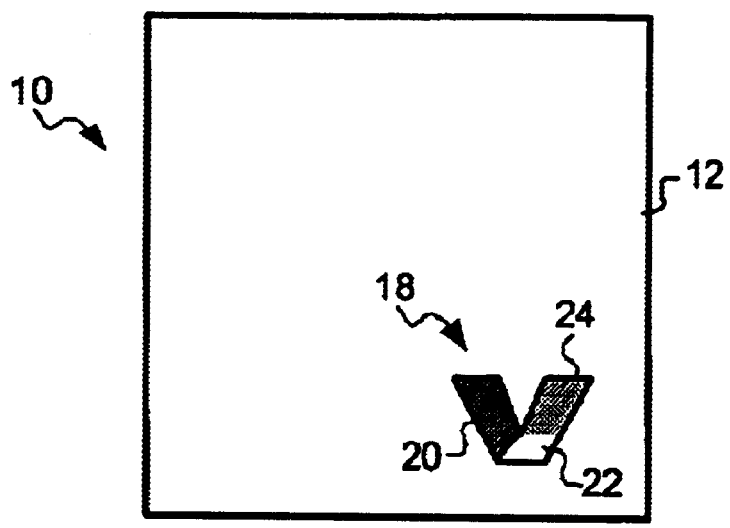
FIG. 2 shows an image having a second type of watermark that can be produced according to an embodiment of the invention.

For instance, FIG. 2 shows the image 10 as having a colored watermark 18. The watermark 18 can have one or more different colors 20, 22, 24, which can be transparent, semi-transparent, or opaque. Furthermore, the colors 20, 22, 24 need not necessarily be the same or any particular color. They can be portions of the watermark 18 that have a different luminance (e.g., brightness or darkness) relative to each other or relative to the image data in the region 12. It is also possible to make the colors 20, 22, 24 the same color, yet have different shades, luminance, etc. Consequently, the invention is not limited by the specific shape, color, luminance, shade or other such design characteristic of watermarks 14 and 18.

During the normal course of manufacturing a conventional imaging device, a manufacturing step is added subsequent to the manufacture of the raw wafer, with the wafer including a sensor array having CMOS components on a silicon substrate, such as with the types of imaging devices sold by OmniVision Technologies, Inc. of Sunnyvale, Calif., the assignee of the present invention. This manufacturing step is undertaken if a color output from the imaging device is desired, and involves placement of an array of color filters over the sensor array.

The array of color filters typically comprises the additive primaries (e.g., Red, Green and Blue) or the subtractive primaries (e.g., Yellow, Cyan and Magenta) arranged in a pattern. The color filters are composed of resist compounds that are distinctly colored according to these primary colors. During the manufacturing process for the color filter array, a series of resist applications and selective stripping actions are used, with the aid of photo masks that are typical to semiconductor processes. One of several color filter patterns can be used, but typically, the Bayer pattern is used for normal color imaging devices. The output of the color filter array is then interpolated into a known color space standard, such as YUV 4:2:2 or RGB, when the imaging device is operating.

As is known with conventional imaging devices, the color filters overlie corresponding photosensitive elements/pixels of the sensor array. The pixels beneath the color filters emit signals when they are exposed to the type of light indicated by overlying the color filter (e.g., based on the color transparency characteristic of the color filters). Thus, a red signal could be obtained from a pixel beneath a red color filter, a blue signal could be obtained from a pixel beneath a blue color filter, etc. These signals can then be processed by circuitry of the imaging device, including luminance signal processing circuitry and chromaticity signal processing circuitry, to generate a color image. Examples of color filter patterns and their associated processing circuitry are disclosed in U.S. Pat. No. 3,971,065 (Bayer pattern) and U.S. Pat. No. 5,901,257, both of which are incorporated herein by reference.

According to an embodiment of the invention, a color filter pattern is altered or deviated so as to differ from the normal color pattern and is then interpolated normally during operation of the imaging device. As a result, the areas of an image where the differing color pattern is applied appears as an abnormal color, when viewed in comparison to adjacent areas where the conventional color filter pattern is not altered. An embodiment of the invention uses a logo or other identifying trademark as the basis to alter the normal color filter pattern, which produces a watermark of altered color in the image data output stream from the imaging device.

Figure 3:
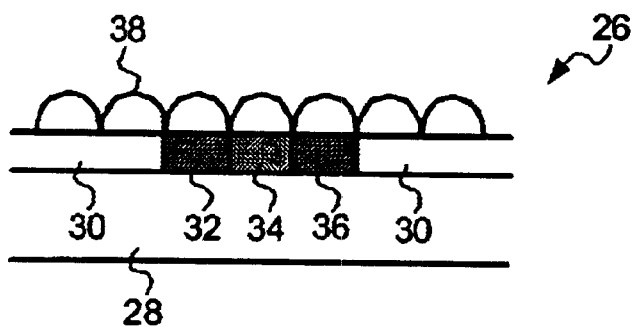
FIG. 3 is a cross-sectional view of a first embodiment of the invention that can be used to add a watermark to an image and/or video data stream.

FIG. 3 is a cross-sectional view of portion of an image sensor 26 according to an embodiment of the invention. The image sensor 26 includes one or more layers 28, which can include conventional image sensor elements, such as a substrate, a sensor array having pixels or photosensitive elements, one or more planarization layers, etc. For simplicity of explanation and illustration, these various elements or the associated signal processing circuitry are not shown herein, and are instead collectively shown as the layer 28.

A color filter array, having color filters 30 arranged according to known configurations overlies the layer 28. The color filter array may be a single layer or it may comprise multiple layers. Furthermore, one or more planarization layers may be present between the color filter array and the layer 28, or between other layers and elements.

In an embodiment of the invention, a plurality of color filters 32, 34, 36 of the color filter array are altered or deviated from the normal color pattern provided by the color filters 30. The particular color filters to alter can be adjoining, adjacent, scattered/non-adjoining, etc. color filters. Furthermore, any number of color filters may be altered (not just the three color filters 32, 34, 36 shown for illustrative purposes), with the number, groups, position, color, pattern, etc. of the altered color filters being based on the watermark to be generated. An array of microlenses 38 overlies the color filter array.

In one embodiment, the altered color filters 32, 34, 36 can be the same color as the normal color filters 30, but arranged in a non-conventional pattern in order to produce the watermarks 14 or 18. In another embodiment, the color filters 32, 34, 36 can be completely different colors than the color filters 30. In yet another embodiment, the altered color filters 32, 34, 36 can comprise both different colors than the color filters 30 and the same colors as the color filters 30 (but could be arranged in a non-conventional pattern).

An embodiment of a method for altering the color filter patterns employs a modified set of photo masks. The modified photo masks can use the types that are typically used to form color filters today. According to this method, a different photo mask can be sequentially used for each color (e.g., a first mask is used to form the red color filters, a second mask is used to form the blue color filters, etc.), with each photo mask having regions for the conventional arrangement of a given filter color and other regions for the non-conventional arrangement of that filter color (e.g., regions that correspond to the watermark). In this manner, for example, an RGB color filter pattern can have a conventional Red, Green, Blue arrangement in one region, while having a non-conventional Red, Green, Blue arrangement in another region for the watermark.

Furthermore, in an embodiment where the watermark is based on color filters having colors that are different from colors of adjacent color filters, separate photo masks may be used to form the pattern for the different colors. For example, a first set of photo masks can be used to form the conventional RGB pattern, and a second set of photo masks can be used to form a Cyan, Yellow, White, and Green pattern for the watermark pattern. These color filters may be formed on the same layer, or they may be formed on multiple layers.

As is known, the addition of color filters blocks a significant amount of light. Furthermore, since the light-sensitive area of each pixel of the sensor array is somewhat less than 100% (typically in the neighborhood of 40% of the area allowed for the pixel), micro-lenses 38 are added to effectively increase the fill factor (e.g., to focus the light to the light-sensitive area of the pixel), thereby making the imaging device more sensitive to light.

An embodiment of the invention alters a characteristic of one or more microlenses overlying the color filters, such as altering the size of the micro-lenses, changing the shape of the micro-lenses, and/or leaving out the micro-lenses all together in a particular pattern. As a result, that pattern is discernable in the output image data as a difference in luminance, when compared to the luminance of the image that corresponds to pixels underlying non-altered microlenses.

Figure 4:
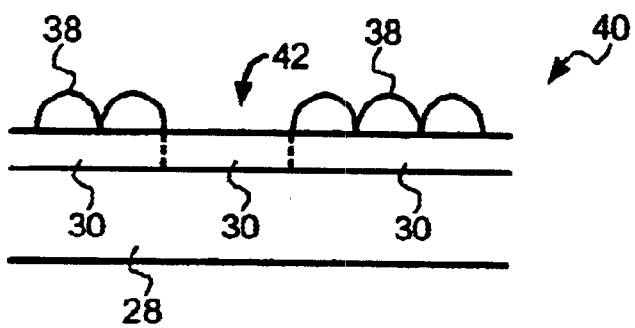
FIG. 4 is a cross-sectional view of a second embodiment of the invention that can be used to add a watermark an image and/or video data stream.

FIG. 4 is a cross-sectional view of a portion of an image sensor 40 according to an embodiment of the invention that has the pattern or array of the microlenses 38 altered. Specifically with the image sensor 40, the pattern of the microlenses 38 is altered by selectively removing microlenses at locations 42, such that the locations 42 form a pattern corresponding to the watermarks 14 or 18. Any number of microlenses 38 may be removed according to any desired pattern, (e.g., adjacent/adjoining microlenses, non-adjoining microlenses, individual or groups of microlenses, etc.).

By removing microlenses at the locations 42, the amount of light received by the pixels underlying these locations 42 differs relative to other pixels, thereby producing a change in luminance in the corresponding regions of the image 10. The color filters underlying the locations 42 can be color filters 30 arranged in a conventional pattern, or they can be altered color filters or filter patterns, such as those described with reference to FIG. 3.

Another embodiment of the invention provides microlenses having a different color than the balance of the micro-lenses on the sensor array. As a result, image data from pixels corresponding to the colored micro-lenses are discernable as different than image data from the rest of the pixels of the sensor array. If the basis for the color pattern of the micro-lenses is a logo or other identifying trademark, then a watermark is produced along with the original video.

Figure 5:
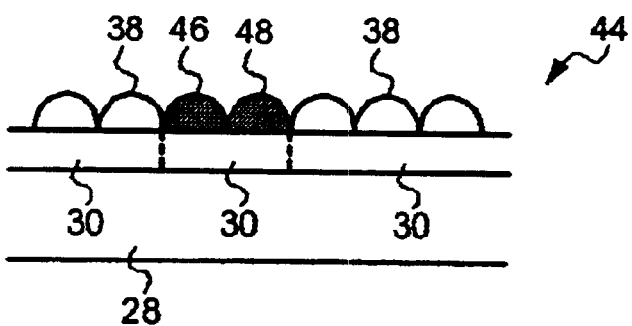
FIG. 5 is a cross-sectional view of a third embodiment of the invention that can be used to add a watermark an image and/or video data stream.

FIG. 5 is a cross-sectional view of a portion of an image sensor 44 according to an embodiment of the invention that alters the pattern of the microlenses 38 by changing the color of selected ones of the microlenses. Specifically with the image sensor 44, a plurality of microlenses 46 and 48, for example, have different colors than the other microlenses 38. This change in color results in a corresponding change in the amount of light sensed by the underlying pixels, thereby resulting in a change in luminance of regions of the image 10 that correspond to the watermarks 14 or 18.

As before, the microlenses having altered colors can be adjoining, separated, individual, or groups of microlenses. Furthermore, the altered microlenses can have different colors, different transparencies, different shades, or other characteristics that affect how much light is passed on to the underlying pixels. Additionally, and like before, color filters underlying the altered microlenses 46 and 48 can have the color filters 30 arranged in a conventional pattern, or altered color filters or filter patterns, such as these described with reference to FIG. 3.

Figure 6:
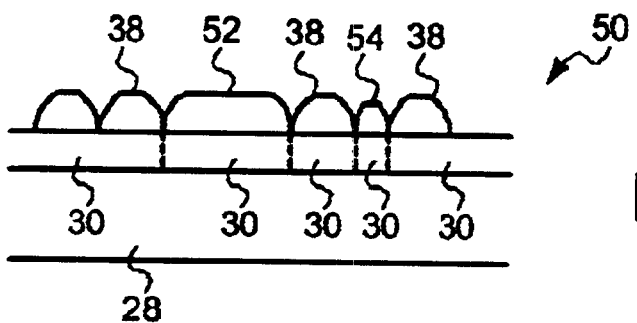
FIG. 6 is a cross-sectional view of a fourth embodiment of the invention that can be used to add a watermark an image and/or video data stream.

FIG. 6 is a cross-sectional view of a portion of an image sensor 50 according to an embodiment of the invention that alters the pattern of the microlenses 38 by changing the shape of selected ones of the microlenses. For example, a microlens 52 can be made wider, while a microlens 54 is made narrower. Other possible alterations include making selected ones of the microlenses thicker, thinner, or different arcuate shapes. As before, altering the shape of the microlenses also changes the amount of light received by the underlying pixels, and so, the pattern of microlenses having altered shapes can be designed according to a desired watermark.

The color filters underlying the altered microlenses 52 and 54 can have color filters 30 arranged in a conventional pattern, or can have color filters having their colors/patterns altered, such as those described with reference to FIG. 3.

Figure 7:
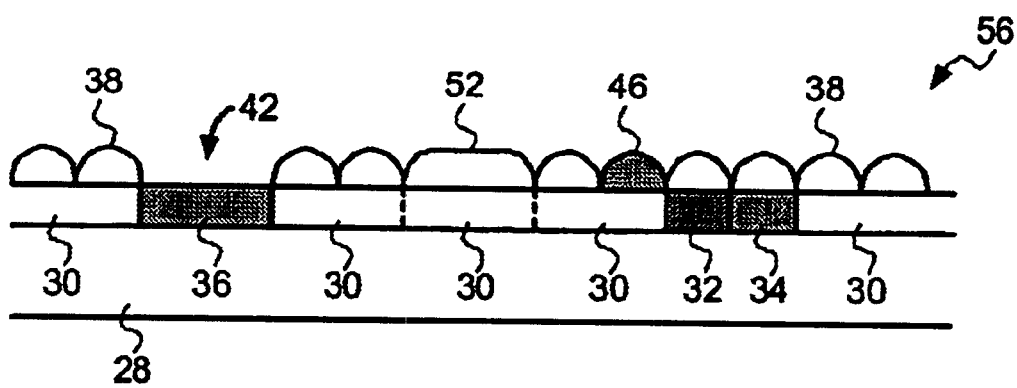
FIG. 7 is a cross-sectional view of a fifth embodiment of the invention that can be used to add a watermark an image and/or video data stream.

A myriad possible combinations of altered patterns of microlenses, colors of filters, or color filter patterns can be implemented, depending on the features of the desired watermark. For example, FIG. 7 shows a cross-sectional view of a portion of an image sensor 56 that uses a combination of both altered microlenses (such as the altered microlenses shown in FIGS. 4–6) and altered color filters/patterns (such as those shown in FIG. 3).

An embodiment of a method for altering the pattern or array of microlenses 38 in this manner employs a modified set of photo masks. The modified photo masks can use the types that are typically used to presently form microlenses for imaging devices. The photo masks can be modified so that individual microlenses are not present, altered in shape or size, altered in position, etc. If colored microlenses are used as the basis for the watermark, then separate photo mask(s) can be used to form the colored microlenses, while conventional photo masks or other conventional methods can be used to form the normal microlenses.

An advantage of above-described embodiments is that the watermark is encoded in the original video stream and that the watermark is made as a permanent part of the imaging device. Because further post-processing to remove the watermark from the original data can be easily detected, such a feature is very useful in areas such as law enforcement. The watermarks serve to verify that the image/video information is valid and is not edited video information, and as such, can be later introduced as strong evidence in a court of law. Furthermore, types/styles of watermarks applied to imaging devices can be easily controlled by simply controlling access to the photo masks used to manufacture the color filter array, at the point of manufacture. Another advantage is that theft of watermarked imaging devices will be discouraged, since each imaging device has a permanent watermark that can uniquely identify its owner.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

For example, while specific colors for the color filters and microlenses are provided herein, it is understood that such colors are merely examples of the types of colors that can be used. A person skilled in the art having the benefit of this disclosure will easily recognize that other colors may be used, depending on the desired appearance of the watermark and/or of the accompanying image.

As another example, although color filters or colored microlenses are described herein, it is understood that principles of the invention can be applied to black-and-white imaging devices. Thus, the term "color" can be used in some contexts to refer to different shades of gray, between black and white, when implementing the altered microlenses or color filters/patterns described in the preceding embodiments.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A CMOS integrated circuit comprising:
    a sensor array formed in a semiconductor substrate; and
    a filter array formed as part of said integrated circuit and over the sensor array, the filter array having a plurality of filters arranged in a pattern representative of a watermark that is combined with image data derived from the sensor array.

2. The CMOS integrated circuit of claim 1 wherein the filter array comprises a color filter array, the plurality of filters arranged in the pattern representative of the watermark having color transparency characteristics different from color transparency characteristics of other filters of the color filter array.

3. The CMOS integrated circuit of claim 1 wherein the plurality of filters arranged in the pattern representative of the watermark are arranged in a pattern different from a pattern of other filters of the filter array.

4. The CMOS integrated circuit of claim 1 wherein the filter array comprises a black-and-white filter array.

5. The CMOS integrated circuit of claim 1 wherein the filter array is disposed on different layers.

6. The CMOS integrated circuit of claim 1, further comprising an array of microlenses, formed as part of said integrated circuit, the array of microlenses having a pattern that can be combined with the pattern of the plurality of filters to represent the watermark.

7. The CMOS integrated circuit of claim 6 wherein the patter of the array of microlenses includes microlenses having color transparency characteristics different from color transparency characteristics of other microlenses of the array of microlenses.

8. The CMOS integrated circuit of claim 6 wherein the pattern of the array of microlenses includes microlenses having shapes substantially different from shapes of other microlenses of the array of microlenses.

9. The CMOS integrated circuit of claim 6 wherein the pattern of the array of microlenses includes regions devoid of microlenses.

10. A CMOS integrated circuit comprising:
    a sensor array formed in a semiconductor substrate; and
    an array of microlenses formed as part of said integrated circuit and over the sensor array; the array of microlenses having a pattern representative of a watermark that is combined with image data derived from the sensor array.

11. The CMOS integrated circuit of claim 10 wherein the pattern of the array of microlenses includes microlenses having color transparency characteristics different from color transparency characteristics of other microlenses of the array of microlenses.

12. The CMOS integrated circuit of claim 10 wherein the pattern of the array of microlenses includes microlenses having shapes substantially different from shapes of other microlenses of the array of microlenses.

13. The CMOS integrated circuit of claim 10 wherein the pattern of the array of microlenses includes regions devoid of microlenses.

14. The CMOS integrated circuit of claim 10, further comprising a filter array formed as part of said integrated circuit and disposed between the sensor array and the array of microlenses, the filter array having a plurality of filters arranged in a pattern that can be combined with the pattern of the array of microlenses to represent the watermark.

15. The CMOS integrated circuit of claim 14 wherein the pattern of the plurality of filters is different from a pattern of other filters of the filter array, or includes filters having transparency characteristics different from transparency characteristics of other filters of the filter array.

16. A CMOS image sensor formed on a single integrated circuit die, said image sensor comprising:
    a plurality of pixels formed in a semiconductor substrate; and
    a color filter layer formed over said plurality of pixels and as part of said integrated circuit die, said color filter layer having a watermark pattern formed therein such that images captured and output by said image sensor include said watermark pattern.

17. A CMOS image sensor formed on a single integrated circuit die, said image sensor comprising:
    a plurality of pixels formed in a semiconductor substrate; and
    an array of microlenses formed over said plurality of pixels and as part of said integrated circuit die, said array of microlenses having a watermark pattern formed therein such that images captured and output by said image sensor include said watermark pattern.

18. The image sensor of claim 17 wherein the pattern of the array of microlenses includes microlenses having color transparency characteristics different from color transparency characteristics of other microlenses of the array of microlenses.

19. The image sensor of claim 17 wherein the pattern of the array of microlenses includes microlenses having shapes substantially different from shapes of other microlenses of the array of microlenses.

20. The image sensor of claim 17 wherein the pattern of the array of microlenses includes regions devoid of microlenses.

* * * * *